United States Patent
Ahn et al.

(10) Patent No.: US 10,056,648 B2
(45) Date of Patent: Aug. 21, 2018

(54) SECONDARY BATTERY INCLUDING ELECTROLYTE ADDITIVE

(71) Applicant: LG Chem, Ltd., Seoul (KR)

(72) Inventors: Kyoung-Ho Ahn, Daejeon (KR); Chul-Haeng Lee, Daejeon (KR); Doo-Kyung Yang, Daejeon (KR); Jong-Ho Jeon, Daejeon (KR); Yoo-Seok Kim, Daejeon (KR); Min-Jung Kim, Daejeon (KR); Jung-Hoon Lee, Daejeon (KR); Yi-Jin Jung, Daejeon (KR)

(73) Assignee: LG Chem, Ltd. (KR)

( * ) Notice: Subject to any disclaimer, the term of this patent is extended or adjusted under 35 U.S.C. 154(b) by 568 days.

(21) Appl. No.: 14/554,645

(22) Filed: Nov. 26, 2014

(65) Prior Publication Data

US 2015/0079480 A1    Mar. 19, 2015

Related U.S. Application Data

(63) Continuation of application No. PCT/KR2013/006132, filed on Jul. 10, 2013.

(30) Foreign Application Priority Data

Jul. 10, 2012  (KR) .................. 10-2012-0075153
Jul. 12, 2012  (KR) .................. 10-2012-0075818

(51) Int. Cl.
*H01M 10/0567* (2010.01)
*H01M 4/485* (2010.01)
(Continued)

(52) U.S. Cl.
CPC ....... *H01M 10/0567* (2013.01); *H01M 4/131* (2013.01); *H01M 4/485* (2013.01);
(Continued)

(58) Field of Classification Search
CPC ..................................... H01M 10/05
(Continued)

(56) References Cited

U.S. PATENT DOCUMENTS

2002/0164531 A1* 11/2002 Sekino ............... H01M 2/0285
                                                                429/331
2007/0026318 A1   2/2007  Kishi et al.
(Continued)

FOREIGN PATENT DOCUMENTS

JP    2005243620 A    9/2005
JP    2007035413 A    2/2007
(Continued)

OTHER PUBLICATIONS

International Search Report from PCT/KR2013/006132, dated Oct. 14, 2013.

*Primary Examiner* — James Lee
(74) *Attorney, Agent, or Firm* — Lerner, David, Littenberg, Krumholz & Mentlik, LLP

(57) ABSTRACT

Disclosed is a secondary battery including an electrode assembly, which includes a cathode, an anode and a separator interposed therebetween, and an electrolyte, wherein the anode includes lithium titanium oxide (LTO) as an anode active material and the electrolyte contains a phosphate-based compound as an additive.

8 Claims, 1 Drawing Sheet

(51) Int. Cl.
*H01M 10/0565* (2010.01)
*H01M 10/052* (2010.01)
*H01M 4/131* (2010.01)
*H01M 10/0525* (2010.01)
*H01M 10/058* (2010.01)
*H01M 4/02* (2006.01)
*H01M 4/505* (2010.01)

(52) U.S. Cl.
CPC ....... *H01M 10/052* (2013.01); *H01M 10/058* (2013.01); *H01M 10/0525* (2013.01); *H01M 10/0565* (2013.01); *H01M 4/505* (2013.01); *H01M 2004/027* (2013.01); *H01M 2220/20* (2013.01); *H01M 2220/30* (2013.01); *H01M 2300/0028* (2013.01); *H01M 2300/0085* (2013.01); *Y02E 60/122* (2013.01); *Y02T 10/7011* (2013.01)

(58) Field of Classification Search
USPC .................................................. 429/121–347
See application file for complete search history.

(56) References Cited

U.S. PATENT DOCUMENTS

| | | |
|---|---|---|
| 2007/0243468 A1 | 10/2007 | Ryu et al. |
| 2010/0003604 A1* | 1/2010 | Kang ..................... C07F 9/091 |
| | | 429/314 |
| 2011/0027646 A1 | 2/2011 | Lee et al. |
| 2011/0027663 A1 | 2/2011 | Ohkubo et al. |
| 2011/0135987 A1 | 6/2011 | Shin |

FOREIGN PATENT DOCUMENTS

| | | |
|---|---|---|
| KR | 2001-0066813 A | 7/2001 |
| KR | 2007-0044840 A | 5/2007 |
| KR | 100744835 B1 | 7/2007 |
| KR | 2008-0112977 A | 12/2008 |
| KR | 2011-0010516 A | 2/2011 |
| KR | 2011-0064689 A | 6/2011 |
| WO | 2009110490 A1 | 9/2009 |

\* cited by examiner

[Fig. 1]
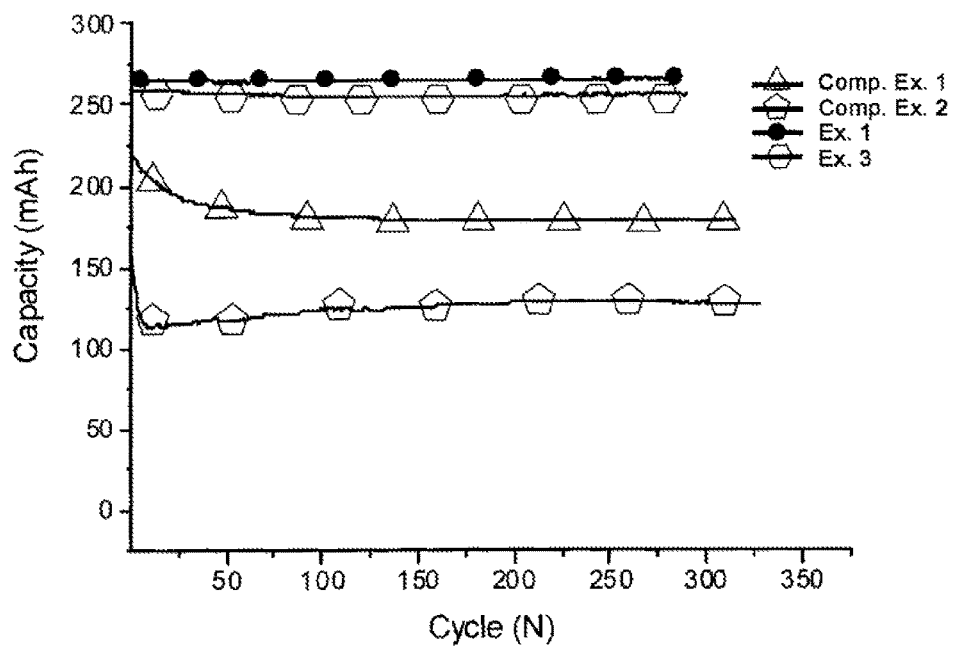
[Fig. 2]
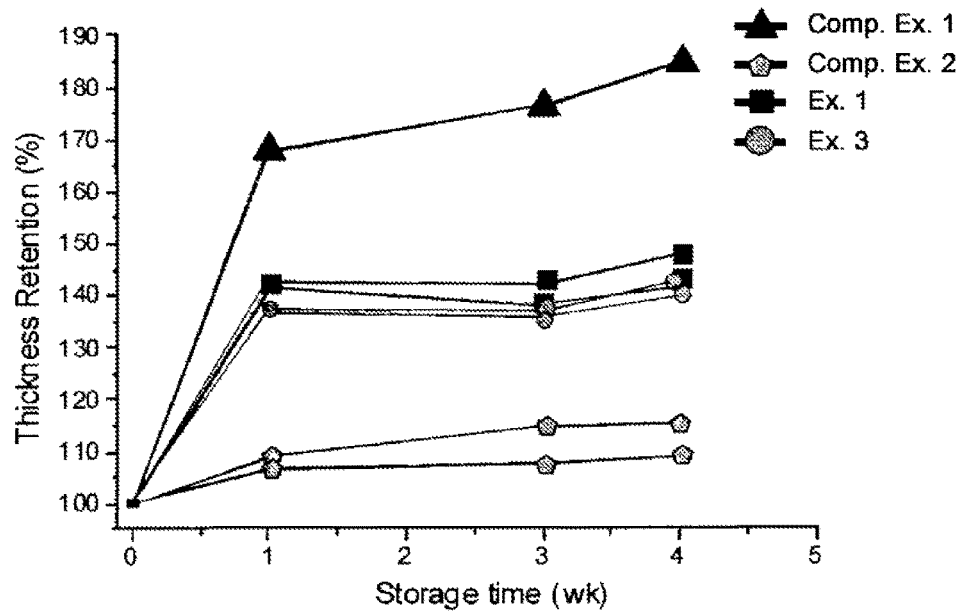

SECONDARY BATTERY INCLUDING ELECTROLYTE ADDITIVE

CROSS-REFERENCE TO RELATED APPLICATIONS

The present application is a continuation of International Application No. PCT/KR2013/006132 filed Jul. 10, 2013, which claims priority from Korean Application Nos. 10-2012-0075818 filed Jul. 12, 2012 and 10-2012-0075153 filed Jul. 10, 2012, the disclosures of which are hereby incorporated herein by reference.

TECHNICAL FIELD

The present invention relates to a secondary battery that includes an electrode assembly including a cathode, an anode and a separator interposed therebetween and an electrolyte, wherein the anode includes lithium titanium oxide (LTO) as an anode active material and the electrolyte contains a phosphate-based compound as an additive.

BACKGROUND ART

Technological development and increased demand for mobile devices have led to rapid increase in the demand for secondary batteries as energy sources. Among such secondary batteries, lithium secondary batteries having high energy density, high operating voltage, long cycle span and low self-discharge rate are commercially available and widely used.

In addition, increased interest in environmental issues has recently brought about a great deal of research associated with electric vehicles (EV) and hybrid electric vehicles (HEV) as alternatives to vehicles using fossil fuels, such as gasoline vehicles and diesel vehicles, which are a main cause of air pollution. Such electric vehicles generally use nickel-metal hydride (Ni-MH) secondary batteries as power sources. However, a great deal of study associated with use of lithium secondary batteries having high energy density, high discharge voltage and stable output is currently underway and some are commercially available.

Lithium secondary batteries may be classified into lithium-ion batteries containing liquid electrolytes per se, lithium-ion polymer batteries containing liquid electrolytes in a gel form, and lithium polymer batteries containing solid electrolytes, depending upon the type of electrolyte employed. Particularly, use of lithium-ion polymer or gel polymer batteries is on the rise due to various advantages thereof such as high safety owing to a low probability of fluid leakage, as compared to liquid electrolyte batteries, and the possibility of achieving very thin and lightweight batteries.

A lithium-ion battery is manufactured by impregnating a liquid electrolyte containing a lithium salt into an electrode assembly that includes a cathode and an anode, each being formed by applying an active material to a current collector, with a porous separator interposed between the cathode and anode.

Methods for fabricating a lithium-ion polymer battery are divided into a fabrication method of a non-crosslinked polymer battery and a fabrication method of a directly-crosslinked polymer battery, depending upon the type of a matrix material for electrolyte impregnation. Acrylate- and methacrylate-based materials having high radical polymerization reactivity and ether-based materials having high electrical conductivity are typically used as the polymer matrix materials. In particular, in directly-crosslinked polymer battery fabrication, a battery is fabricated by placing a jelly-roll type or stack type electrode assembly composed of electrode plates and a porous separator in a pouch, injecting a thermally polymerizable polyethylene oxide (PEO)-based monomer or oligomer crosslinking agent and an electrolyte composition into the pouch, and thermally curing the injected materials. Manufacture of batteries in this manner is advantageous in that electrode plates and separators of conventional lithium-ion batteries are used without change. However, directly-crosslinked polymer battery fabrication has problems in that a crosslinking agent is not completely cured and remains in the electrolyte, increasing viscosity. This makes uniform impregnation difficult, thereby greatly degrading battery properties.

A carbon-based material is typically used as an anode active material for lithium secondary batteries. However, the carbon-based material has a low potential of 0V relative to lithium and thus reduces the electrolyte, generating gases. Lithium titanium oxide (LTO) having a relatively high potential is also used as an anode active material for lithium secondary batteries to solve these problems.

However, when LTO is used as an anode active material, the LTO acts as a catalyst, generating a large amount of hydrogen gas during activation and charge/discharge processes, which causes a reduction in secondary battery safety.

Thus, there is a great need to provide a technology that secures battery safety by solving the above problems while maintaining overall battery performance.

DISCLOSURE

Technical Problem

Therefore, the present invention has been made to solve the above and other technical problems that have yet to be resolved.

As a result of intensive studies and various experiments, the present inventors discovered that desired effects are achieved when a secondary battery including lithium titanium oxide (LTO) as an anode active material and a phosphate-based compound as an electrolyte additive is used. The present invention has been completed based on this discovery.

Technical Solution

In accordance with the present invention, the above and other objects can be accomplished by the provision of a secondary battery including an electrode assembly including a cathode, an anode and a separator interposed therebetween and an electrolyte, wherein the anode includes lithium titanium oxide (LTO) as an anode active material, and the electrolyte contains a phosphate-based compound as an additive.

In a specific embodiment, the electrolyte may be, but is not limited to, any of a liquid electrolyte, a gel electrolyte and a solid electrolyte. Specifically, the electrolyte may be a liquid electrolyte or a gel polymer electrolyte.

When the electrolyte is a liquid electrolyte, decomposition of the electrolyte may be promoted by side reaction of the electrolyte with the anode active material, thereby generating gas as described above. Such gas may cause safety problems of the secondary battery such as swelling or explosion. Thus, the secondary battery according to the present invention uses a liquid electrolyte with a phosphate-based compound added thereto to solve such problems.

When the electrolyte is a gel polymer electrolyte, the phosphate-based compound additive, which reacts as a crosslinking agent, is added to the gel polymer electrolyte. This provides effects of superior cycle characteristics while achieving electrode interface stabilization, thus greatly inhibiting swelling caused by gas generation during storage at high temperature. As a result, the effects of greatly improved battery lifespan and safety are also achieved.

Here, it is believed that, since the phosphate-based compound has high reactivity with radicals, it increases the extent of polymerization reaction, thereby improving electrochemical stability of the final electrolyte. In addition, LTO used as an anode active material acts as a catalyst to promote crosslinking polymerization of the phosphate-based compound, thereby maximizing the effects described above.

Particularly, when the electrolyte is a gel polymer electrolyte, side reactions of the electrolyte with the electrodes are reduced during repeated charge/discharge since an area of the electrolyte in contact with the electrodes is reduced and swelling is also inhibited due to a reduction in vapor pressure since the electrolyte is in a gel polymer form.

In one embodiment, the phosphate-based compound may include at least one selected from the group consisting of a phosphate-based acrylate of Formula (1), a pyrophosphate-based acrylate of Formula (2) and a phosphate-based urethane acrylate:

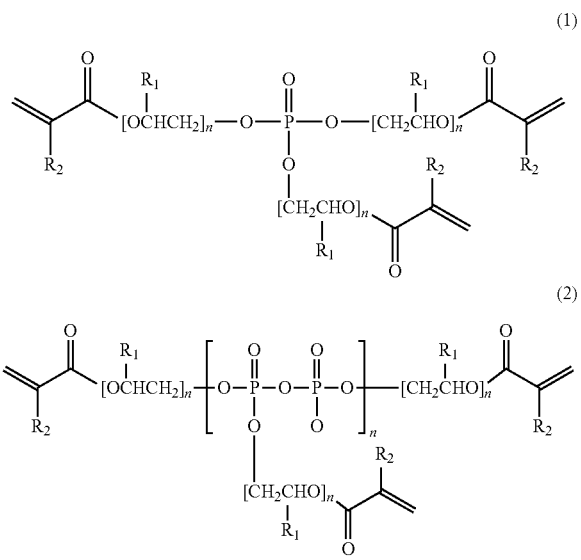

where $R_1$ and $R_2$ are each independently hydrogen, methyl or F and n is an integer of 1 to 20.

The electrolyte may further contain a multifunctional compound polymerizable with the phosphate-based compound.

When a multifunctional compound polymerizable with the phosphate-based compound is additionally used as an electrolyte additive, the multifunctional compound and the phosphate-based compound can complement electrochemical and mechanical characteristics of each other, thereby further improving overall characteristics of the battery.

Particularly, when a gel polymer electrolyte is prepared using both the phosphate-based compound and a multifunctional compound polymerizable with the phosphate-based compound, physical properties with higher elasticity are achieved. That is, a phosphate-based compound, which has a structure enabling easy coordination with lithium ions, thus exhibiting higher bonding force, and a multifunctional compound having high elasticity are polymerized through crosslinking together, such that the phosphate-based compound and the multifunctional compound complement electrochemical and mechanical characteristics of each other.

In an embodiment, the multifunctional compound may include at least one selected from the group consisting of a (meth)acrylic acid ester compound, an unsaturated carbonic acid compound and a vinyl compound.

The (meth)acrylic acid ester compound may include a (meth)acrylate compound having at least two acrylate groups per molecule and the (meth)acrylate compound may include a monomer of Formula (3) or an oligomer thereof:

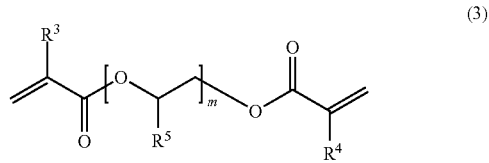

where $R^3$, $R^4$ and $R^5$ are each independently hydrogen or substituted or unsubstituted $C_1$-$C_4$ alkyl, and m is an integer of 1 to 20.

In addition, the (meth)acrylic acid ester compound may include, but is not limited to, at least one selected from the group consisting of diethylene glycol diacrylate (Di(EG)DA), diethylene glycol dimethacrylate (Di(EG)DM), ethylene glycol dimethacrylate (EGDM), dipropylene diacrylate (Di(PG)DA), dipropylene glycol dimethacrylate (Di(PG)DM), ethylene glycol divinyl ether (EGDVE), ethoxylated (6) trimethylolpropane triacrylate (ETMPTA), diethylene glycol divinyl ether (Di(EG)DVE), triethylene glycol dimethacrylate (Tri(EG)DM), dipentaerythritol pentaacrylate (DPentA), trimethylolpropane triacrylate (TMPTA), trimethylolpropane trimethacrylate (TMPTM), propoxylated(3) trimethylolpropane triacrylate (PO(3)TMPTA), propoxylated(6) trimethylolpropane triacrylate (PO(6)TMPTA), poly(ethylene glycol)diacrylate (PA1) and poly(ethylene glycol)dimethacrylate.

The multifunctional compound, together with the phosphate-based compound, may form various types of copolymers, for example, random copolymers, block copolymers, and graft copolymers.

The electrolyte may contain 0.1 to 1%, more specifically 0.1 to 0.5%, by weight of the multifunctional compound polymerizable with the phosphate-based compound, based on the total weight of the electrolyte.

The electrolyte may contain 0.01 to 30%, more specifically 0.01 to 20%, by weight of the phosphate-based compound, based on the total weight of the electrolyte.

If the content of the phosphate-based compound is excessively low when the electrolyte is a liquid electrolyte, the effects of improved safety are not fully achieved. On the contrary, if the content of the phosphate-based compound is excessively high, overall battery characteristics may be degraded since the content of lithium salt is relatively lowered although safety is improved.

If the content of the phosphate-based compound is excessively low when the electrolyte is a gel polymer electrolyte, gel polymers are not easily formed such that the phenomenon of swelling of the battery occurring when a liquid electrolyte is used may worsen and formation of a substrate having a desired thickness may be difficult. On the contrary, if the content of the phosphate-based compound is excessively high, the density of gel polymers is increased and lithium ion conduction rate (or conductivity) is accordingly reduced, causing precipitation of lithium, with the result that battery performance is reduced. In addition, viscosity is increased, such that there may be difficulty in uniform application of the electrolyte to a corresponding portion.

The same is true when the multifunctional compound is added to the phosphate-based compound. Thus, the electrolyte may contain the phosphate-based compound and the multifunctional compound in a total amount of 0.01 to 30%, more specifically 0.1 to 5%, based on the total weight of the electrolyte.

The liquid electrolyte may include an electrolyte (plasticizer) and a lithium salt. When the electrolyte is a gel polymer electrolyte, the electrolyte may further include a polymerization initiator.

The electrolyte also serves as a plasticizer. Examples of the electrolyte include aprotic organic solvents such as N-methyl-2-pyrollidinone, propylene carbonate (PC), ethylene carbonate (EC), butylene carbonate (BC), dimethyl carbonate (DMC), diethyl carbonate (DEC), ethyl methyl carbonate (EMC), gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate. These materials may be used singly or as a mixture of two or more thereof.

The lithium salt is a material that dissolves and dissociates into lithium ions in the non-aqueous electrolyte. Examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenylborate and imides. These materials may be used singly or as a mixture of two or more thereof.

The electrolyte may contain 0.01 to 30%, more specifically 0.1 to 20%, by weight of the lithium salt based on the total weight of solid components included in the electrolyte.

Examples of the polymerization initiator may include azo compounds such as 2,2-azobis(2-cyanobutane), 2,2-azobis (methylbutyronitrile), 2,2'-azoisobutyronitrile (AIBN) and azobisdimethyl-valeronitrile (AMVN), peroxy compounds such as benzoyl peroxide, acetyl peroxide, dilauryl peroxide, di-tert-butyl peroxide, cumyl peroxide and hydrogen peroxide, and hydroperoxides. Specifically, AIBN, 2,2'-azobis(2, 4-dimethyl valeronitrile) (V65), di-(4-tert-butylcyclohexyl)-peroxydicarbonate (DBC) or the like may be used as the polymerization initiator.

The polymerization initiator may decompose at a temperature of 40 to 80° C. to form radicals and may then react with monomers through free radical polymerization to form a gel polymer electrolyte. Generally, free radical polymerization is carried out by sequential reactions including an initiation reaction involving formation of transient molecules having high reactivity or active sites, a propagation reaction involving re-formation of active sites at the ends of chains by addition of monomers to active chain ends, a chain transfer reaction involving transfer of the active sites to other molecules and a termination reaction involving destruction of active chain centers. Of course, polymerization may also be carried out without a polymerization initiator.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrroles, 2-methoxy ethanol, aluminum trichloride or the like may be added to the electrolyte. Where appropriate, the non-aqueous electrolyte may further include a halogen-containing solvent such as carbon tetrachloride or ethylene trifluoride in order to impart incombustibility. Further, the non-aqueous electrolyte may additionally include carbon dioxide gas in order to improve high-temperature storage characteristics.

The secondary battery according to the present invention may be a lithium-ion battery. The lithium-ion battery may be fabricated by mounting an electrode assembly in a battery case, injecting a mixture of a phosphate-based compound, an electrolyte and a lithium salt into the battery case, followed by sealing, and performing a formation process to activate the battery and an aging process to stabilize the activated battery.

However, when the electrolyte is a gel polymer electrolyte, an activation process is performed after gel reaction. When the phosphate-based compound is used as an additive to the electrolyte, a method in which film formation is induced through wetting and charge/discharge may be employed while the gel reaction is omitted. In a basic method, the battery is charged up to a level, at which an electrochemical decomposition reaction of monomers may occur, and degassing is then performed.

The formation process is a process that activates the battery by repeating charge/discharge cycles. The aging process is a process that stabilizes the battery activated in the formation process by allowing the battery to stand for a certain period of time.

Conditions under which the formation process and the aging process are carried out are not particularly limited and are adjustable within conventional ranges well known in the art.

In a specific embodiment, the mixture is injected into the battery case (primary injection) and the battery structure is allowed to stand for a certain period of time (for example, 10 hours) such that uniform impregnation of the mixture into the battery case is achieved. The battery is then charged for activation. In the charge process for activation, gases generated during formation of a protective film for the anode are removed. Thereafter, the battery is again allowed to stand for a certain period of time (for example, 12 hours) and charged for activation, thereby completing battery fabrication.

The secondary battery according to the present invention may be a lithium-ion polymer battery. Specifically, the lithium-ion polymer battery may be fabricated using a method including (a) mounting an electrode assembly in a battery case, (b) injecting a mixture of a phosphate-based compound, a polymerization initiator, an electrolyte and a lithium salt into the battery case, followed by sealing, and (c) polymerizing the phosphate-based compound to form a gel polymer electrolyte.

Specifically, step (c) may include (c1) subjecting the battery to thermal curing, photocuring via irradiation with electron beams or gamma rays, or a stabilization reaction at 30 to 80° C. to polymerize the phosphate-based compound, and (c2) performing a formation process to activate the battery and an aging process to stabilize the activated battery.

Specifically, the crosslinking reaction may be carried out under inert conditions. Since the reaction of radicals with atmospheric oxygen serving as a radical scavenger is fundamentally blocked under inert atmosphere, it is possible to enhance the extent of reaction to a level at which substantially no unreacted monomers are present. This prevents degradation in charge/discharge performance caused by a large amount of unreacted monomers remaining inside the battery.

The inert atmosphere conditions are not particularly limited. Known gases with low reactivity can be used. For example, at least one selected from the group consisting of nitrogen, argon, helium and xenon may be used as inert gases.

Phosphate-based compounds are combined via the crosslinking polymerization reaction to form crosslinked polymers having a three-dimensional network structure, and the polymers are then uniformly impregnated with the electrolyte.

The crosslinked polymer electrolyte is electrochemically stable and therefore can be stably present in the battery without being damaged even after repeated charge/discharge cycles. As a result, it is possible to improve battery safety and achieve excellent mechanical properties such as elongation and bending properties. Further, battery performance deterioration can be minimized due to continuous migration and transfer of lithium ions through the polar gel polymer electrolyte.

The formation and aging processes are performed in the same manner as described above. During the formation process, lithium ions that are liberated from lithium metal oxide used as the cathode upon charging of the battery migrate and intercalate into the carbon electrode used as the anode. Here, compounds such as $Li_2CO_3$, LiO and LiOH, which are produced by the reaction of highly-reactive lithium with the carbon anode, form a solid electrolyte interface (SEI) film on the anode surface. In this case, an unreacted crosslinking agent may undergo additional reaction.

In a specific embodiment, the mixture is injected into the battery case (primary injection) and the battery structure is allowed to stand for a certain period of time (for example, 3 hours) such that uniform impregnation of the mixture into the battery case is achieved. Thermal polymerization is then carried out under the above-specified conditions. The battery is then charged for activation. In the charge process for activation, gases generated during formation of a protective film for the anode are removed and a certain amount of supplementary mixture is secondarily injected into the battery case. Thereafter, the battery is again allowed to stand for a certain period of time (for example, 12 hours) and charged for activation, thereby completing battery fabrication.

The secondary battery is generally fabricated by incorporating an electrolyte into an electrode assembly including a cathode and an anode with a separator interposed therebetween.

The cathode is prepared, for example, by applying a mixture of a cathode active material, a conductive material and a binder to a cathode current collector, followed by drying, and pressing. A filler may be added to the mixture as needed.

The cathode current collector is generally manufactured to a thickness of 3 to 500 μm. Any cathode current collector may be used without particular limitation so long as high conductivity is provided without causing chemical changes in the battery. Examples of the cathode current collector include stainless steel, aluminum, nickel, titanium, sintered carbon, or aluminum or stainless steel surface-treated with carbon, nickel, titanium or silver. The cathode current collector may include fine irregularities on the surface thereof so as to enhance adhesion to the cathode active material. In addition, the cathode current collector may be used in various forms such as a film, a sheet, a foil, a net, a porous structure, a foam and a nonwoven fabric.

Examples of the cathode active material include, but are not limited to, layered compounds such as lithium cobalt oxide ($LiCoO_2$) and lithium nickel oxide ($LiNiO_2$) alone or substituted by one or more transition metals; lithium manganese oxides such as $Li_{1+x}Mn_{2-x}O_4$ (where $0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithium nickel oxides represented by $LiNi_{1-x}M_xO_2$ (M=Co, Mn, Al, Cu, Fe, Mg, B or Ga and $0.01 \leq x \leq 0.3$); lithium manganese composite oxides represented by $LiMn_{2-x}M_xO_2$ (M=Co, Ni, Fe, Cr, Zn or Ta and $0.01 \leq x \leq 0.1$) or $Li_2Mn_3MO_8$ (M=Fe, Co, Ni, Cu or Zn); $LiMn_2O_4$ wherein Li is partially substituted by alkaline earth metal ions; disulfide compounds; and $Fe_2(MoO_4)_3$.

The conductive material is commonly added in an amount of 0.01 to 50% by weight, based on the total weight of the mixture including the cathode active material. Any conductive material may be used without particular limitation so long as suitable conductivity is provided without causing chemical changes in the battery. Examples of the conductive material include graphite such as natural or artificial graphite, carbon blacks such as acetylene black, Ketjen black, channel black, furnace black, lamp black and thermal black, conductive fibers such as carbon fibers and metallic fibers, metallic powders such as carbon fluoride, aluminum and nickel powders, conductive whiskers such as zinc oxide and potassium titanate whiskers, conductive metal oxides such as titanium oxide, and polyphenylene derivatives.

The binder is a component assisting in binding of an active material to a conductive material and a current collector. The binder is commonly added in an amount of 1 to 50% by weight, based on the total weight of the compound including the cathode active material. Examples of the binder include polyfluorovinylidene, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymers (EPDM), sulfonated EPDM, styrene butadiene rubbers, fluoro-rubbers and various copolymers.

The filler is a component optionally used to inhibit cathode expansion. Any filler may be used without particular limitation so long as the filler is a fibrous material that does not cause chemical changes in the battery. Examples of the filler include olefin-based polymers such as polyethylene and polypropylene and fibrous materials such as glass fibers and carbon fibers.

For example, the anode is prepared by applying an anode active material to an anode current collector, followed by drying and pressing. The anode may further include other components as needed as described above.

The anode current collector is generally manufactured to a thickness of 3 to 500 μm. Any anode current collector may be used without particular limitation so long as suitable conductivity is provided without causing chemical changes in the battery. Examples of the anode current collector include copper, stainless steel, aluminum, nickel, titanium, sintered carbon, copper or stainless steel surface-treated with carbon, nickel, titanium or silver, or an aluminum-cadmium alloy. Similar to the cathode current collector, the anode current collector may include fine irregularities on the surface thereof so as to enhance bonding force to the anode active material. In addition, the anode current collector may be provided in various forms such as a film, a sheet, a foil, a net, a porous structure, a foam and a nonwoven fabric.

Lithium titanium oxide may be used as the anode active material as described above.

Specifically, the lithium titanium oxide may be $Li_4Ti_5O_{12}$, $LiTi_2O_4$ or a mixture thereof. More specifically, the lithium titanium oxide may be $Li_4Ti_5O_{12}$.

Examples of the anode active material may include a mixture of carbon such as non-graphitized carbon or graphitized carbon, metal composite oxide such as $Li_xFe_2O_3$ ($0 \leq x \leq 1$), $Li_xWO_2$ ($0 \leq x \leq 1$) or $Sn_xMe_{1-x}Me'_yO_z$ (Me: Mn, Fe, Pb or Ge; Me': Al, B, P, Si, Group I, II and III elements of the Periodic Table or halogens; $0 < x \leq 1$, $1 \leq y \leq 3$, and $1 \leq z \leq 8$), a lithium metal, a lithium alloy, a silicon-based alloy, a tin-based alloy, metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ or $Bi_2O_5$, a conductive polymer such as polyacetylene and a Li—Co—Ni based material.

The secondary battery according to the present invention may be fabricated in various forms. For example, the electrode assembly may be constructed in a jelly-roll structure, a stacked structure, a stacked/folded structure or the like. The battery may be structured such that an electrode assembly is installed inside a battery case made of a cylindrical can, a prismatic can or a laminate sheet including a metal layer and a resin layer. Such a structure of the battery is widely known in the art and therefore a detailed description thereof is omitted herein.

The secondary battery may be a lithium secondary battery.

The secondary battery may be used not only as a power source for small-scale devices but also as a power source for middle or large-scale devices as described below.

The present invention also provides a battery module including the secondary battery as a unit cell and a battery pack including the battery module.

The battery pack may also be used as a power source for middle or large-scale devices that require high-temperature safety, long cycle span and high rate properties.

Specific examples of the middle or large-scale devices include, but are not limited to, power tools that are powered by electrical motors, electric vehicles (EVs) including hybrid electric vehicles (HEVs) and plug-in hybrid electric vehicles (PHEVs), electric two-wheeled vehicles including electric bikes (E-bikes) and electric scooters (E-scooters), electric golf carts and power storage systems.

Advantages

Since lithium titanium oxide (LTO) is used as an anode active material and a phosphate-based compound is used as an additive, a secondary battery according to the present invention achieves electrode interface stabilization, thereby preventing generation of gases and by-products. Thus, the secondary battery exhibits not only high safety but also improved lifespan and high-power characteristics.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a graph showing comparison of cycle characteristics in a 45° C. chamber according to Experimental Example 2; and FIG. 2 is a graph showing comparison of the extent of gas generation associated with high-temperature storage lifespan in a 60° C. chamber according to Experimental Example 3.

BEST MODE

The present invention will now be further described through examples. However, it should be noted that the following examples are given only to exemplify the present invention without limiting the scope of the invention.

Example 1

An anode active material ($Li_{1.33}Ti_{1.67}O_4$), a conductive material (Denka black) and a binder (PVdF) were added in a weight ratio of 95:2.5:2.5 to NMP, followed by mixing, to prepare an anode mix. The anode mix was then applied to a copper foil having a thickness of 20 μm to form a coating layer having a thickness of 60 μm, followed by rolling and drying, to produce an anode.

In addition, $LiNi_{0.5}Mn_{1.5}O_4$ as a cathode active material, a conductive material (Denka black) and a binder (PVdF) were added in a weight ratio of 95:2.5:2.5 to NMP, followed by mixing, to prepare a cathode mix. The cathode mix was then applied to a copper foil having a thickness of 20 μm, followed by rolling and drying, to produce a cathode.

A polyethylene membrane (Celgard, thickness: 20 μm) was then interposed as a separator between the anode and the cathode to form an electrode assembly. A liquid electrolyte with 1M $LiPF_6$ dissolved in an EC/EMC solvent at ½ volume ratio, to which a phosphate-based acrylate ($R_1$ is H and n is 1 in Formula (1)) was added as a phosphate-based material in an amount of 5% by weight based on the total weight of the electrolyte, was injected into a pouch, in which the electrode assembly was mounted, to fabricate a pouch battery.

Example 2

A pouch battery was fabricated in the same manner as in Example 1 except that a pyrophosphate-based acrylate ($R_1$ is H and n is 1 in Formula (2)) was used as a phosphate-based material.

Example 3

A pouch battery was fabricated in the same manner as in Example 1 except that dipentaerythritol pentaacrylate (DPentA) was additionally added as a multifunctional compound to the electrolyte in an amount of 0.2% by weight based on the weight of the solvent.

Example 4

A pouch battery was fabricated in the same manner as in Example 2 except that dipentaerythritol pentaacrylate (DPentA) was additionally added as a multifunctional compound to the electrolyte in an amount of 0.2% by weight based on the weight of the solvent.

Example 5

A pouch battery was fabricated in the same manner as in Example 1 except that 2,2'-azoisobutyronitrile (AIBN) was added as a polymerization initiator to the electrolyte in an amount of 0.1% by weight based on the weight of the solvent after injection of the electrolyte and high-temperature reaction was then carried out at a temperature of 70° C. for 5 hours to prepare a gel polymer electrolyte.

Example 6

A pouch battery was fabricated in the same manner as in Example 2 except that 2,2'-azoisobutyronitrile (AIBN) was added as a polymerization initiator to the electrolyte in an amount of 0.1% by weight based on the weight of the solvent after injection of the electrolyte and high-temperature reaction was then carried out at a temperature of 70° C. for 5 hours to prepare a gel polymer electrolyte.

Comparative Example 1

A pouch battery was fabricated in the same manner as in Example 1 except that an electrolyte with no phosphate-based acrylate ($R_1$ is H and n is 1 in Formula (1)) added thereto was used.

Comparative Example 2

A pouch battery was fabricated in the same manner as in Example 6 except that an electrolyte was injected after a phosphate-based acrylate ($R_1$ is H and n is 1 in Formula (1)) was added to the electrolyte in an amount of 40% by weight.

Experimental Example 1

Batteries (with a design capacity of 265 mAh) fabricated in Examples 1 to 6 and Comparative Examples 1 and 2 were subjected to a formation process at 2.75 V. The batteries were charged/discharged at a certain C-rate in a range between 1.6 V and 2.75 V to verify discharge capacity. Results are shown in Table 1 below.

TABLE 1

|  | Discharge Capacity |
| --- | --- |
| Ex. 1 | 259 mAh |
| Ex. 2 | 255 mAh |
| Ex. 3 | 256 mAh |
| Ex. 4 | 252 mAh |
| Ex. 5 | 255 mAh |
| Ex. 6 | 256 mAh |
| Comp. Ex. 1 | 250 mAh |
| Comp. Ex. 2 | 230 mAh |

Experimental Example 2

Cycle characteristics of batteries fabricated in Examples 1 and 3 and Comparative Examples 1 and 2 were measured while the batteries were charged/discharged at a C-rate of 5 C in a range between 1.6 V and 2.75 V in a 45° C. chamber. Results are shown in FIG. 1.

Experimental Example 3

Batteries (with a design capacity of 265 mAh) fabricated in Examples 1 and 3 and Comparative Examples 1 and 2 were subjected to a formation process at 2.75 V. The extent of gas generation by side reaction was measured after the batteries were stored in an SOC of 100% at a high temperature of 60° C. Results are shown in FIG. 2.

As can be seen from FIGS. 2 and 3, Comparative Example 1 generated an excessive amount of gases and Comparative Example 2 significantly degraded cycle characteristics, whereas Examples 1 to 6 according to the present invention generated a small amount of gases, securing high safety, and also exhibited superior cycle characteristics.

As is apparent from the above description, a secondary battery according to the present invention has a variety of advantages. For example, since lithium titanium oxide (LTO) is used as an anode active material and a phosphate-based compound is used as an additive, the secondary battery achieves electrode interface stabilization, thereby preventing generation of gases and by-products. Thus, the secondary battery exhibits not only high safety but also improved lifespan and high-power characteristics.

It will be apparent to those skilled in the art that various modifications and variations are possible in light of the above teaching without departing from the scope of the invention.

The invention claimed is:

1. A secondary battery comprising an electrode assembly comprising a cathode, an anode and a separator interposed therebetween, and an electrolyte,
wherein the anode comprises lithium titanium oxide (LTO) as an anode active material, and
the electrolyte is a liquid electrolyte, which contains a phosphate-based compound as an additive, wherein the phosphate-based compound comprises at least one selected from the group consisting of a phosphate-based acrylate of Formula (1), a pyrophosphate-based acrylate of Formula (2) and a phosphate-based urethane acrylate:

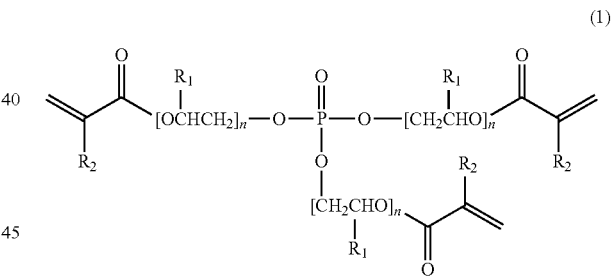

(1)

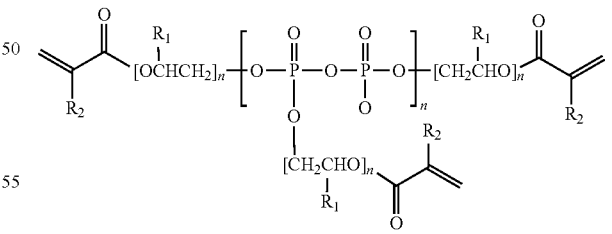

(2)

where $R_1$ and $R_2$ are each independently hydrogen, methyl or F, and n is an integer of 1 to 20.

2. The secondary battery according to claim 1, wherein the electrolyte contains 0.01 to 30% by weight of the phosphate-based compound based on the total weight of the electrolyte.

3. The secondary battery according to claim 1, wherein the liquid electrolyte comprises an electrolyte serving as a plasticizer and a lithium salt.

4. The secondary battery according to claim 3, wherein the electrolyte contains 0.01 to 30% by weight of the lithium salt based on the total weight of solid components included in the electrolyte.

5. A battery module comprising the secondary battery according to claim 1 as a unit cell.

6. A battery pack comprising the battery module according to claim 5.

7. A device comprising the battery pack according to claim 6.

8. The device according to claim 7, wherein the device is an electric vehicle, a hybrid electric vehicle, a plug-in hybrid electric vehicle or a power storage system.

* * * * *